US006911763B2

United States Patent
Ziegler et al.

(10) Patent No.: US 6,911,763 B2
(45) Date of Patent: Jun. 28, 2005

(54) CLOSED LOOP MOVER ASSEMBLY WITH MEASUREMENT SYSTEM

(75) Inventors: Andrew Ziegler, Arlington, MA (US); David F. Arnone, Mountain View, CA (US); Evan Drake Harriman Green, San Jose, CA (US)

(73) Assignee: New Focus, Inc., a Delaware Corporation, San Jose, CA (US)

( * ) Notice: Subject to any disclaimer, the term of this patent is extended or adjusted under 35 U.S.C. 154(b) by 18 days.

(21) Appl. No.: 10/452,777

(22) Filed: May 30, 2003

(65) Prior Publication Data

US 2004/0239265 A1 Dec. 2, 2004

(51) Int. Cl.[7] .............................................. H01L 41/08
(52) U.S. Cl. ........................... 310/323.02; 310/316.01; 310/323.03
(58) Field of Search ............................ 310/328, 323.02, 310/323.03, 323.04, 323.05, 316.01, 316.02

(56) References Cited

U.S. PATENT DOCUMENTS

| | | | |
|---|---|---|---|
| 4,549,533 A | 10/1985 | Cain et al. | |
| 4,560,263 A * | 12/1985 | Katsuma et al. | 396/133 |
| 4,687,962 A | 8/1987 | Elbert | |
| 4,935,659 A * | 6/1990 | Naka et al. | 310/328 |
| 5,053,670 A * | 10/1991 | Kosugi | 310/328 |
| 5,103,128 A * | 4/1992 | Adachi | 310/323.03 |
| 5,198,935 A * | 3/1993 | Imanari et al. | 359/698 |
| 5,357,423 A | 10/1994 | Weaver et al. | |
| 5,394,049 A | 2/1995 | Luecke | |
| 5,410,206 A | 4/1995 | Luecke et al. | |
| 5,543,670 A | 8/1996 | Luecke | |
| 5,645,260 A | 7/1997 | Falangas | |
| 5,696,420 A | 12/1997 | Inanaga et al. | |
| 5,783,899 A | 7/1998 | Okazaki | |
| 5,805,448 A | 9/1998 | Lindsay et al. | |
| 5,902,928 A | 5/1999 | Chen et al. | |
| 6,038,924 A | 3/2000 | Lee et al. | |
| 6,092,431 A | 7/2000 | Okamoto et al. | |
| 6,111,336 A | 8/2000 | Yoshida et al. | |
| 6,115,204 A | 9/2000 | Yokomachi et al. | |
| 6,476,537 B1 | 11/2002 | Pease et al. | |

\* cited by examiner

*Primary Examiner*—Mark Budd
(74) *Attorney, Agent, or Firm*—Steven G. Roeder

(57) ABSTRACT

A mover assembly (16) that moves or positions an object (12) includes a mover output (226), an actuator (230), and a measurement system (20). The mover output (226) is connected to the object (12), and the actuator (230) causes the mover output (226) to rotate about a first axis and move along the first axis. In this embodiment, the measurement system (20) directly measures the movement of the mover output (226) and provides feedback regarding the position of the mover output (226).

15 Claims, 12 Drawing Sheets

CLOSED LOOP MOVER ASSEMBLY WITH MEASUREMENT SYSTEM

FIELD OF THE INVENTION

The present invention relates to a closed loop motor assembly having a measurement system.

BACKGROUND

Micromotors are used as part of an apparatus to make fine adjustments to the position and/or shape of an object. For example, in one type of apparatus, the micromotor is attached to and moves a stage linearly. In this embodiment, the apparatus can include a linear encoder that provides feedback regarding the position of the stage. With this design, the positional feedback of the stage can be used to control the micromotor.

Alternatively, the micromotor can be controlled by commanding a set number of piezo pulses to the micromotor. Because the step size of the micromotor can be somewhat uncertain, this method may not be very useful.

Accordingly, there is a need for a mover assembly having improved accuracy. Additionally, there is an assembly that utilizes one or more highly accurate mover assemblies.

SUMMARY

The present invention is directed to a mover assembly that moves or positions an object. In one embodiment, the mover assembly includes a mover output, an actuator, and a measurement system. The mover output is connected to the object and the actuator causes the mover output to rotate about a first axis and move along the first axis. In this embodiment, the measurement system directly measures the movement of the mover output and provides feedback regarding the position of the mover output.

In one embodiment, the measurement system measures the movement of the mover output along the first axis and/or about the first axis. As an example, the measurement system can include a first encoder component that is secured directly to the mover output and a second encoder component. The first encoder component rotates concurrently with the mover output about the first axis and moves concurrently with the mover output along the first axis. The second encoder component moves concurrently with the mover output along the first axis. In one embodiment, the first encoder component includes a glass plate and the second encoder component includes an encoder head. With this design, the measurement system is a rotary encoder positioned near the rotating mover output that provides position feedback for closed-loop control of the mover assembly.

In one embodiment, the actuator includes a piezoelectric element that causes rotation of the mover output. For example, the actuator can include a pair of opposed jaw elements that engage the mover output and the piezoelectric element can move the jaw elements relative to each other.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
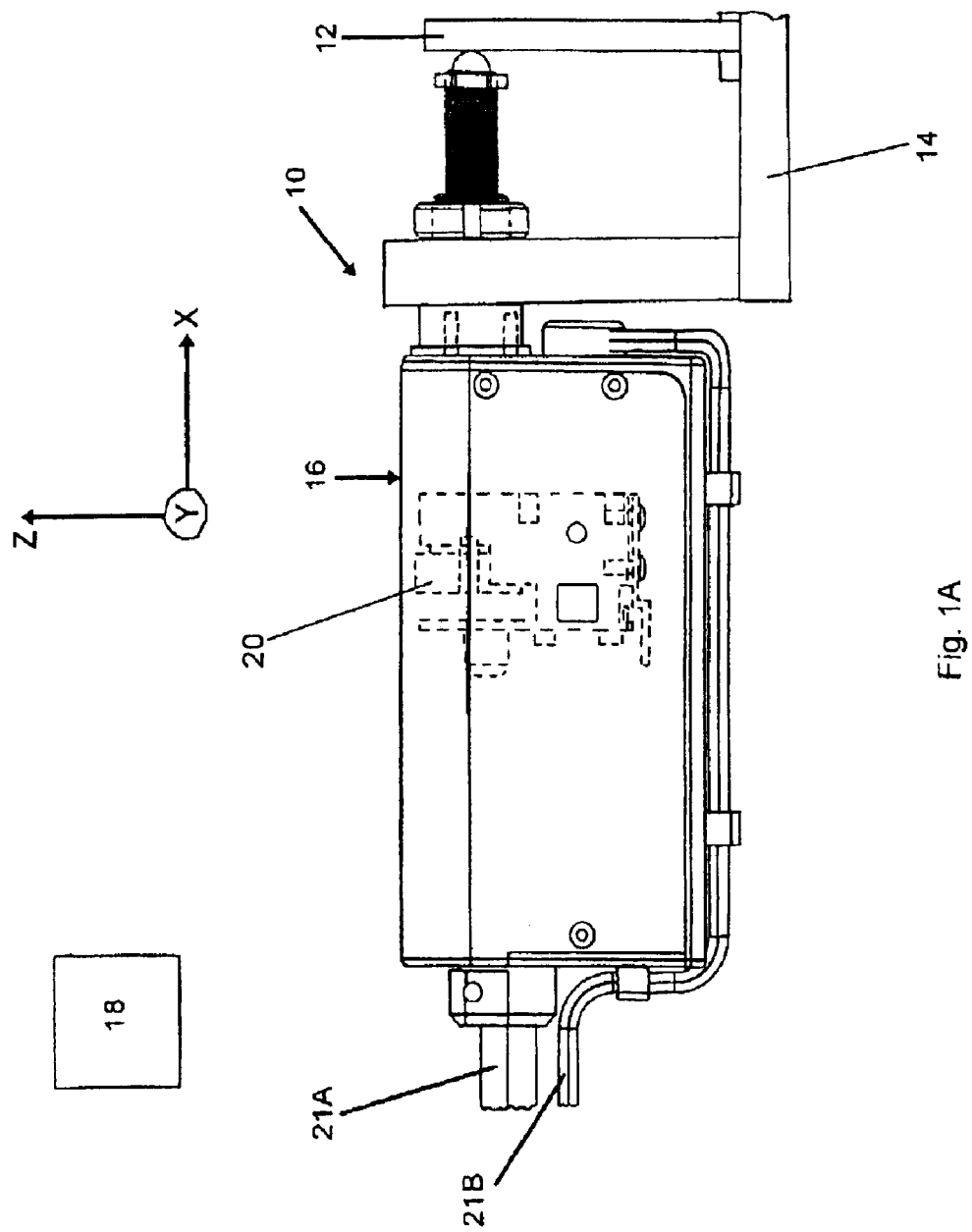
FIG. 1A is a side view of a precision apparatus that utilizes a mover assembly having features of the present invention.

FIG. 1A is a perspective illustration of a precision apparatus 10 having features of the present invention, that makes fine adjustments to the position and/or shape of an object 12. In this embodiment, the precision apparatus 10 includes an apparatus frame 14, a mover assembly 16, and a control system 18. In one embodiment, the mover assembly 16 includes a measurement system 20 (illustrated in phantom) that allows for closed loop control of the mover assembly 16. In this embodiment, the control system 18 is positioned away from the mover assembly 16. Alternatively, the control system 18 can be incorporated into the mover assembly 16.

A number of Figures include an orientation system that illustrates an X axis, a Y axis that is orthogonal to the X axis, and a Z axis that is orthogonal to the X and Y axes. It should be noted that these axes can also be referred to as the first, second, and third axes.

The design of the components of the apparatus 10 and the type of apparatus 10 and object 12 can be varied. For example, the apparatus 10 can be used in technical or scientific instruments including lasers, interferometers, mirrors, lenses, and telescopes. Alternatively, for example, the mover assembly 16 can be used in connection with technical or scientific instruments including lasers, interferometers, mirrors, lenses, and telescopes.

The apparatus frame 14 is rigid and connects the mover assembly 16 to the apparatus 10.

The mover assembly 16 is coupled to the object 12. In one embodiment, the mover assembly 16 has a relatively low mass, small size, high load capability, wide operating temperature range, and/or low power consumption. In one embodiment, the mover assembly 16 provides adjustment with a resolution of about 10 nanometers or less over a range of at least +/−0.1 mm. In alternative embodiments, the adjustment resolution can be greater or less than 10 nanometers and/or the range of travel can be greater or less than +/−0.1 mm.

The control system 18 receives information from the measurement system 20 and directs current to the mover assembly 16 to make fine adjustments to the position and/or shape of the object 12. In FIG. 1A, a first electrical line 21A electrically connects the measurement system 20 to the control system 18 and a second electrical line 21B electrically connects an actuator 230 (illustrated in FIGS. 2A and 2B) of the mover assembly 16 to the control system 18.

As provided herein, the measurement system 20 monitors the position of a portion of the mover assembly 16 and provides the information to the control system 18. Additionally, the measurement system 20 can include one or more sensors (not shown) that also monitor the position or shape of the object 12 and provide the information to the control system 18.

Figure 1B:
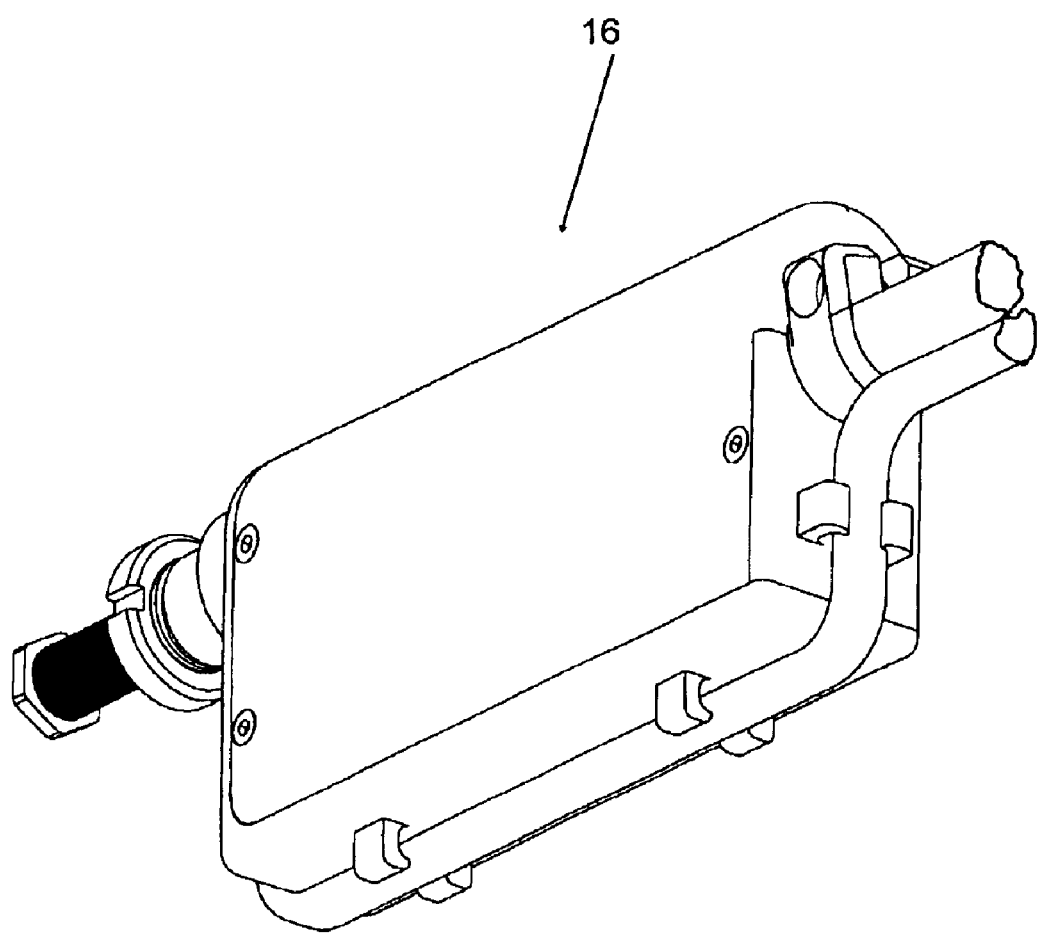
FIG. 1B is a perspective view of the mover assembly of FIG. 1A.

FIG. 1B is a perspective view of the mover assembly 16 of FIG. 1A.

Figure 2A:
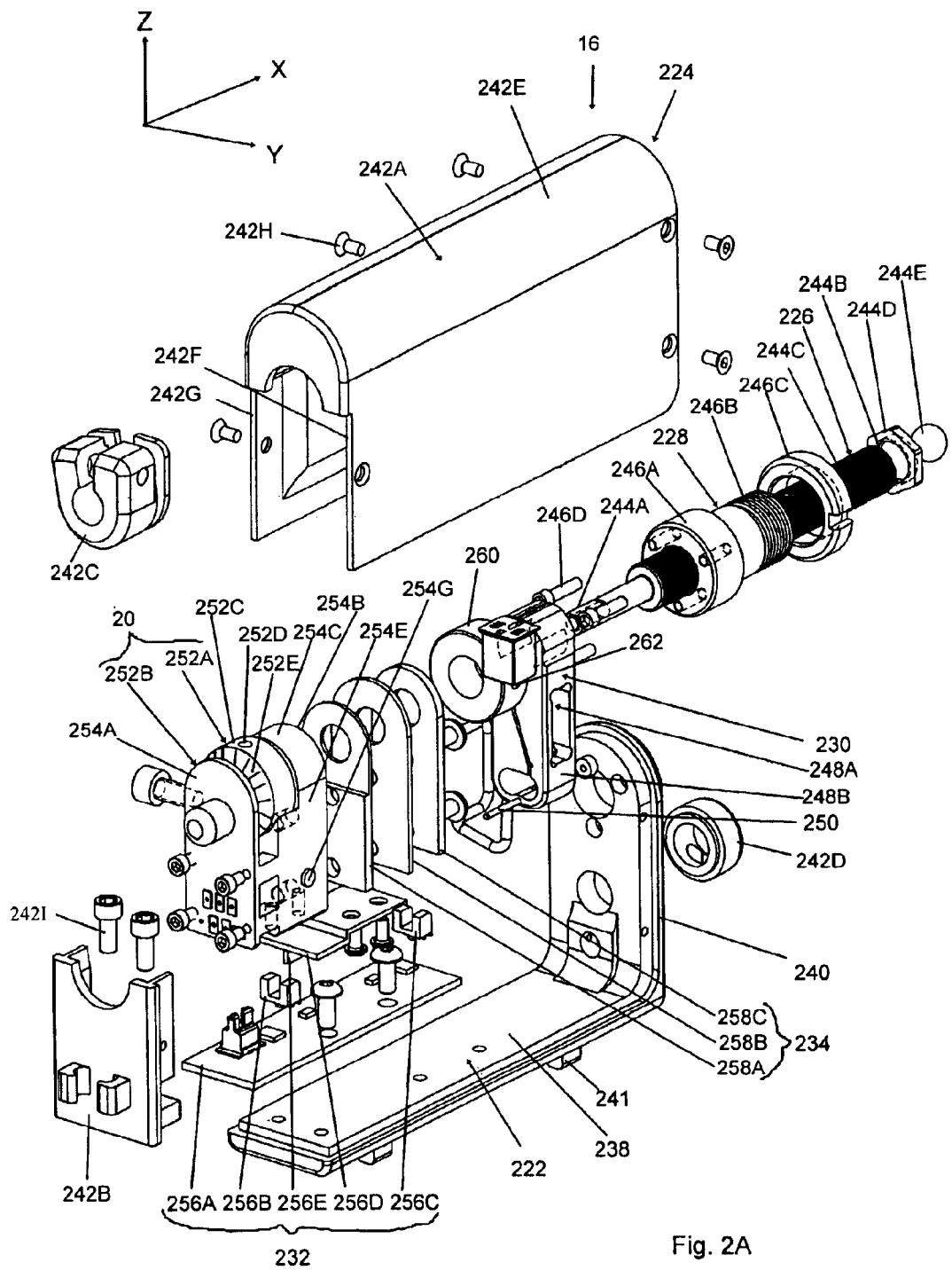
FIG. 2A is a first exploded perspective view of the mover assembly of FIG. 1A.
Figure 2B:
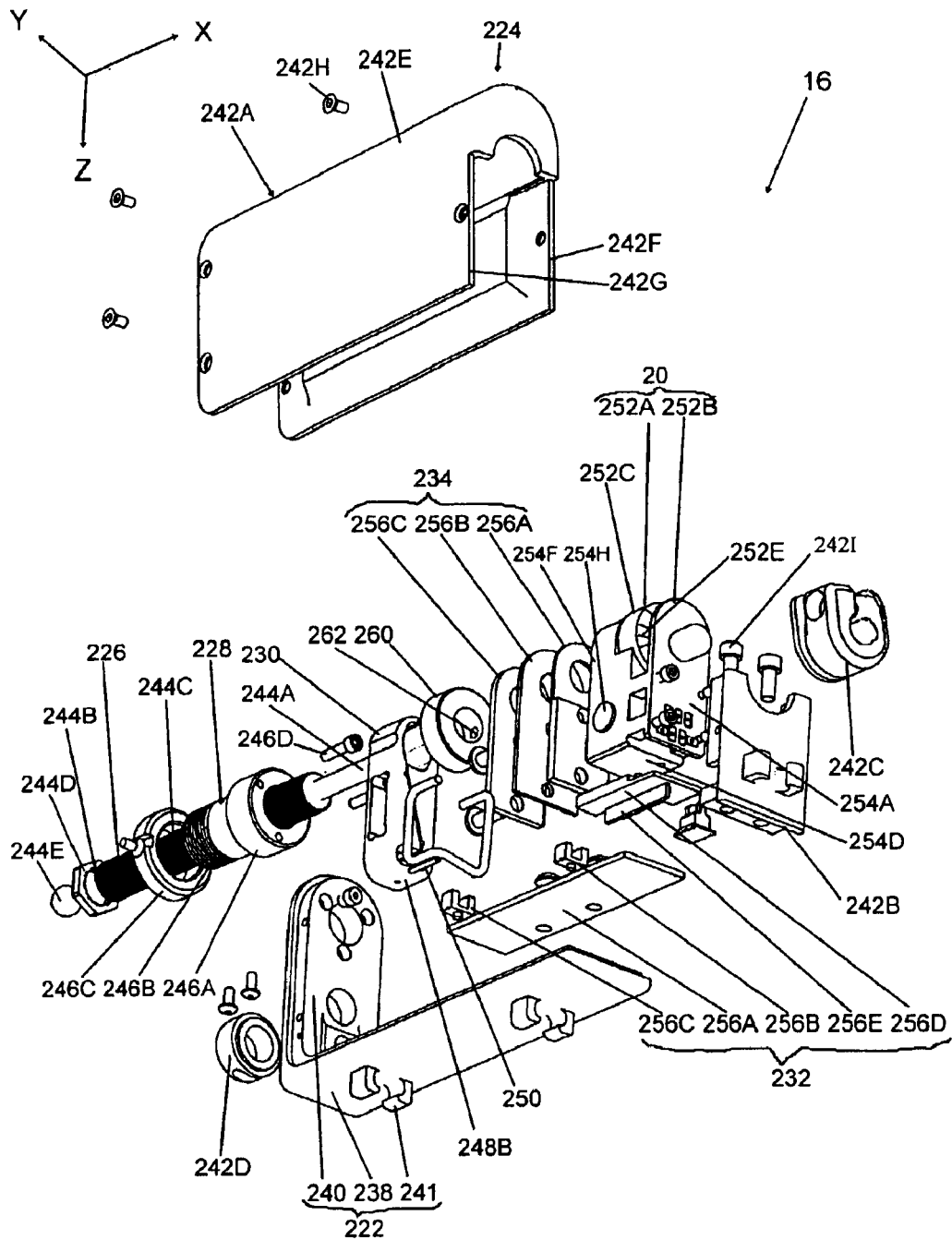
FIG. 2B is an alternative exploded perspective view of the mover assembly of FIG. 1A.

FIG. 2A is a first exploded perspective view and FIG. 2B is a second exploded perspective view of the mover assembly 16 of FIG. 1B. In this embodiment, the mover assembly 16 includes a mover bracket 222, a mover cover 224, a mover output 226, an output guide 228, an actuator 230, the measurement system 20, a limit sensor assembly 232, and a wiper assembly 234. The design, size, shape and/or orientation of one or more of these components can be varied to suit the design requirements of the mover assembly 16.

The mover bracket 222 is rigid and supports some of the other components of the mover assembly 16. In FIGS. 2A and 2B, the mover bracket 222 is shaped somewhat similar to a sideways "L" and includes a bracket base 238 and a bracket arm 240 that extends upward from the bracket base 238. In this embodiment, the mover bracket 222 includes a plurality of clips 241 for securing the second electrical line 21B to the mover bracket 222.

The mover cover 224 cooperates with the mover bracket 222 to enclose some of the components of the mover assembly 16. In FIGS. 2A and 2B, the mover cover 224 includes a main section 242A, an end section 242B, a first line cover 242C, and a second line cover 242D. The main section 242A has a somewhat upside down "U" shape and includes an arch shaped region 242E, a cover first side wall 242F, and a spaced apart cover second side wall 242G. The side walls 242F, 242G extend away from the arch shaped region 242E. In one embodiment, the main section 242A is secured to the mover bracket 222 and the end section 242B with a plurality of fasteners 242H. The end section 242B is secured to the bracket base 238 with a pair of fasteners 242I. The first line cover 242C is secured to the top of the end section 242B and encircles and provides a seal around the first electrical line 21A (illustrated in FIG. 1). Somewhat similarly, the second line cover 242D is secured to the bracket arm 240 and provides a seal around the second electrical line 21B (illustrated in FIG. 1).

In one embodiment, the mover output 226 is rotated about the X axis and is moved laterally along the X axis by the actuator 230 and the output guide 228. In FIGS. 2A and 2B, the mover output 226 is generally cylindrical shaped shaft and includes a proximal shaft end 244A and a distal shaft end 244B. In FIGS. 2A and 2B, a portion of the outer circumference of the mover output 226 includes an externally threaded surface 244C. In one embodiment, the majority of the outer circumference includes an 80 pitch externally threaded surface 244C. Alternatively, the entire outer circumference can include the externally threaded surface 244C, only a small portion of the outer circumference can include the externally threaded surface 244C, or none of the outer circumference can include the externally threaded surface 244C. It should also be noted that the pitch of the externally threaded surface 244C can be greater than 80 pitch or less than 80 pitch.

In one embodiment, the mover output 226 includes a stopper 244D that can be moved relative to the externally threaded surface 244C. In this embodiment, the stopper 244D can be selectively adjusted to engage the output guide 228 to inhibit further travel of the mover output 226 relative to the output guide 228. In FIGS. 2A and 2B, the stopper 244D is a hex nut having an internally threaded surface that corresponds to and engages the externally threaded surface 244C.

Additionally, the mover output 226 can include a ball bearing 244E that fits in a semi-spherical aperture at the distal shaft end 244B. The ball bearing 244E engages the object 12 (illustrated in FIG. 1A) to transfer the linear movement of the mover output 226 to the object. Further, the ball bearing 244E inhibits rotation of the mover output 226 from causing rotation of the object 12.

In one embodiment, the mover output 226 is made of stainless steel or other hard material. The mover output 226 is coupled, contacting and/or connected to the object 12.

In another embodiment, the distal shaft end 244B can be flat or have other shapes as needed.

The output guide 228 supports the mover output 226, guides the mover output 226 and causes rotation of the mover output 226 by the actuator 230 to result in motion of the mover output 226 along the X axis. In FIGS. 2A and 2B, the output guide 228 receives the mover output 226 and includes a generally tubular shaped housing having an annular shaped mounting flange 246A, an internally threaded surface (not shown in FIGS. 2A and 2B), an externally threaded area 246B, and a mount ring 246C that engages the externally threaded area 246B. In one embodiment, the apparatus frame 14 (illustrated in FIG. 1A) fits over a portion of the output guide 228 and is clamped between the mounting flange 246A and the mount ring 246C to secure the mover assembly 16 to the apparatus frame 14.

The internally threaded surface is designed to engage the externally threaded surface 244C of the mover output 226. In FIGS. 2A and 2B, a plurality of guide fasteners 246D extend through the mover bracket 222 and thread into the mounting flange 246A to fixedly secure the output guide 228 to the mover bracket 222. With this design, rotation of the mover output 226 with the actuator 230 about the X axis causes the mover output 226 to move transversely along the X axis relative to the output guide 228 and the rest of the mover assembly 16.

The actuator 230 rotates the mover output 226. The design of the actuator 230 can be varied. In one embodiment, the actuator 230 utilizes a piezoelectric element 248A. However, alternative actuators may be used in connection with the present invention. One example of an actuator which may be used are those sold under the trade name "New Focus Actuator" available from New Focus, Inc., San Jose, Calif. Other actuators include magnetostrictive actuators such as those available from Energen and piezoactuators. One embodiment of an actuator is described in U.S. Pat. No. 5,410,206, issued to Luecke et al. and assigned to New Focus, Inc., the contents of which are incorporated herein by reference.

Figure 3:
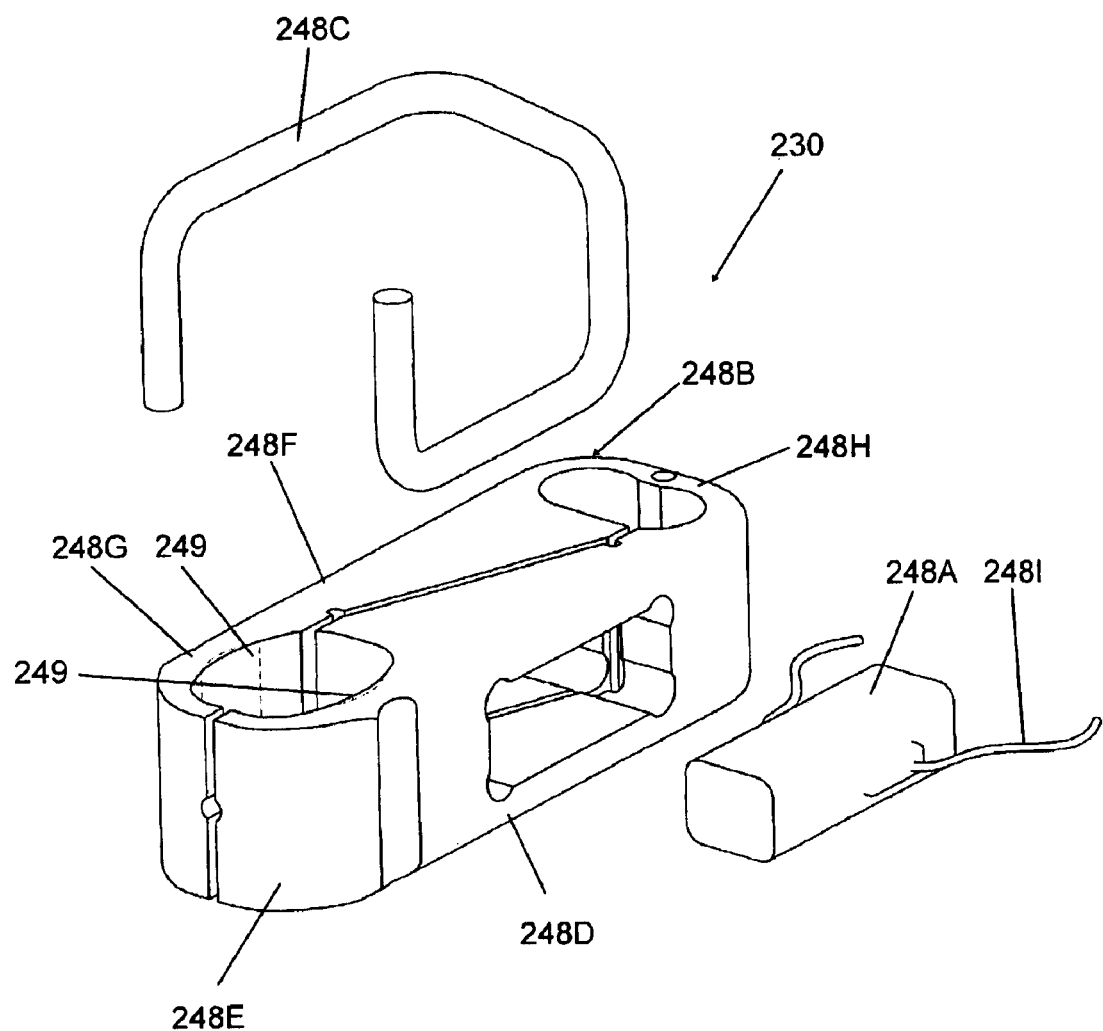
FIG. 3 is an exploded perspective view of an actuator of the mover assembly.

FIG. 3 illustrates an exploded perspective view of the actuator 230. In this embodiment, in addition to the piezoelectric element 248A, the actuator 230 includes an actuator frame 248B and an actuator resilient connector 248C.

The actuator frame 248B is somewhat rectangular shaped and includes (i) a first frame section 248D having a first jaw element 248E, (ii) an adjacent second frame section 248F having a second jaw element 248G, and (iii) a frame base 248H that secures the frame sections 248D, 248F together. The jaw elements 248E, 248G are adjoining and cooperate to fit about the externally threaded surface 244C (illustrated in FIGS. 2A and 2B) of the mover output 226. In one embodiment, each of the jaw elements 248E, 248G includes an inward facing frictional contact area 249 that engages the mover output 226 near the proximal shaft end 244A. In one embodiment, each of the frictional contact areas 249 is a partly internally threaded region. The threads of the partly threaded region of the jaw elements 248E, 248G act together to engage the externally threaded surface 244C of the mover output 226 between the jaw elements 248E, 248G. Stated another way, the internal faces of the jaw elements 248E, 248G are threaded to accommodate the externally threaded surface 244C of the mover output 226.

In an alternative embodiment, the frictional contact area 249 is a roughened area that engages the mover output 226. In this embodiment, the portion of the outer circumference of the mover output 226 that is engaged by the jaw elements 248E, 248G can be threaded or can include a corresponding frictional contact area.

The actuator resilient connector 248C urges the jaw elements 248E, 248G against the externally threaded surface 244C of the mover output 226. Stated another way, the actuator resilient connector 248C urges the jaw elements 248E, 248G together so that the jaw elements 248E, 248G maintain contact with externally threaded surface 244C of the mover output 226.

A pair of spring retention grooves in jaw elements 248E, 248G serve to position and retain the actuator resilient connector 248C in place. The actuator resilient connector 248C may be fashioned from any material having suitable spring and fatigue characteristics.

The piezoelectric element 248A is mounted within the actuator frame 248B. In FIG. 3, a first end of the piezoelectric element 248A is affixed to the frame base 248H and an opposite second end of the piezoelectric element 248A is affixed to a first frame section 248D.

The piezoelectric element 248A has electrodes 248I at the opposite ends. The control system 18 (illustrated in FIG. 1) is electrically connected to the respective electrodes 248I. With this design, the control system 18 can apply a drive signal across the piezoelectric element 248A. The internal structure of piezoelectric element 248A may actually contain a plurality of interconnected electrodes so as to reduce the voltage required to operate the piezoelectric element 248A.

The drive signal causes the length of the piezoelectric element 248A to change. For example, as the amplitude of the drive signal across the piezoelectric element 248A increases, the length of the piezoelectric element 248A increases, and as the amplitude of the drive signal across piezoelectric element 248A decreases, the length of the piezoelectric element 248A decreases.

With the design provided herein, lengthening and shortening of the piezoelectric element 248A causes the first jaw element 248E to move relative to the second jaw element 248G. Assuming that no slippage occurs between the jaw elements 248E, 248G and the mover output 226, rotation of mover output 226 occurs. Stated another way, the piezoelectric element 248A is operative to effect reciprocating motion of the abutting jaw elements 248E, 248G in somewhat parallel paths. The reciprocating motion of the jaw elements 248E, 248G against the mover output 226 held therebetween is converted to simple rotary motion by moving the jaw elements 248E, 248G relatively slowly in a first direction such that the coefficient of friction between the mover output 226 and the jaw elements 248E, 248G overcomes inertia of the mover output 226. Engagement is maintained between the jaw elements 248E, 248G and the mover output 226 to incrementally rotate the mover output 226. Motion of the jaw elements 248E, 248G in the second direction is relatively fast, such that the inertia of the mover output 226 prevents it from following the motion of the jaw elements 248E, 248G and the mover output 226 slips in the jaw elements 248E, 248G, preserving the preceding incremental motion. The result is a stepwise rotation of the mover output 226. Rotational motion of the mover output 226 in the reverse direction is accomplished by simply interchanging the speeds of the motion in the first and second directions.

The duration of slippage depends on the waveform and amplitude of the electrical signal applied across the piezoelectric element 248A, as well as the mechanical characteristics of the system, such as the frictional engagement between jaw elements 248E, 248G and the mover output 226, the inertia of the mover output 226 and other mechanical elements connected to it.

It follows that selective rotation of mover output 226 may be obtained in either direction simply by applying a cyclic electrical signal having the proper waveform and polarity. That is, a cyclic signal having a slowly rising waveform followed by a rapidly falling waveform will cause rotation in a first direction. Conversely, a cyclic signal having a rapidly rising waveform followed by a slowly falling waveform will be effective to rotate mover output 226 in the opposite direction.

In one embodiment, bi-directional rotation of the mover output 226 in the range of 2–3 RPM can be achieved. In one embodiment, a single step of the actuator 230 provides approximately 1 minute of rotational movement of the mover output 226, and very precise positioning on the order of 0.02 micrometers.

Referring back to FIGS. 2A and 2B, in one embodiment, the actuator 230 is secured to the mover bracket 222. In this embodiment, a motor mount pin 250 extends through an aperture in the actuator frame 248B and is secured to the mover bracket 222. With this design, the actuator 230 is inhibited from rotating relative to the mover bracket 222 about the X axis, and the actuator 230 can move slightly along the X axis.

The measurement system 20 directly monitors the position of the mover output 226 and provides measurement information regarding the position of the mover output 226 to the control system 18 so that the control system 18 can accurately direct current to the actuator 230 to precisely control the position of the mover output 226. Stated another way, the measurement system 20 provides positional feedback for closed-loop control of the actuator 230. The design of the measurement system 20 can be varied. For example, the measurement system 20 can include one or more sensors that directly measure the position of the mover output 226.

In FIGS. 2A and 2B, the measurement system 20 is a rotary type encoder that includes a first encoder component 252A that is fixedly secured to the mover output 226 and a second encoder component 252B that is positioned near and adjacent to the first encoder component 252A. In one embodiment, the rotary encoder performs approximately 5000 encoder counts per revolution of the mover output 226. Further, the rotary encoder can move with the mover output 226. The design of each encoder component 252A, 252B can vary.

In FIGS. 2A and 2B, the first encoder component 252A includes a tubular ring shaped housing 252C that encircles the proximal shaft end 244A and a glass plate 252E that is secured to and moves with the housing 252C. With this design, the first encoder component 252A moves concurrently about the X axis and along the X axis with the mover output 226. In this embodiment, the housing 252C is fixedly secured to the proximal shaft end 244A with a fastener 252D, e.g. a set screw that is threaded into the housing 252C and engages the proximal shaft end 244A. Alternatively, for example, the fastener 252D can be an adhesive. The glass plate 252E includes a plurality of etched lines.

In FIGS. 2A and 2B, the second encoder component 252B is an encoder head. In this embodiment, the encoder head detects the motion of the first encoder component 252A and the mover output 226 relative to the encoder head. The encoder head can read the number of lines of the glass plate 252E that moves past the encoder head. In this embodiment, the second encoder component 252B directly measures rotary motion and/or position of the mover output 226. With the information regarding rotary motion of the mover output 226 and the information regarding the thread pitch of the externally threaded surface 244C of the mover output 226, the control system 18 can determine the linear position of the mover output 226. Stated another way, with the known thread pitch of the externally threaded surface 244C of the mover output 226, the control system 18 can convert the rotary encoder information to linear position information of the mover output 226.

In FIGS. 2A and 2B, the second encoder component 252B is somewhat block "U" shaped and includes a light source (not shown), sensor (not shown), a front wall 254A, a rear wall 254B, a top 254C, a bottom 254D, a first side wall 254E and a second side wall 254F. The top 254C includes a cutout for receiving the first encoder component 252A between the front wall 254A and the rear wall 254B. The rear wall 254B includes an aperture to allow the mover output 226 to extend therethrough.

Additionally, the first side wall 254E includes a first contact region 254G that engages the inner surface of the cover first side wall 242F and the second side wall 254F includes a second contact region 254H that engages the inner surface of the cover second side wall 242G. The contact regions 254G, 254H allow the second encoder component 252B to move with the mover output 226 along the X axis and inhibit the second encoder component 252B from rotating with the mover output 226.

The design of each contact region 254G, 254H can vary. In one embodiment, the first contact region 254G includes a low friction contact pad and a spring that connects the contact pad to the first side wall 254E, and the second contact region 254H includes a low friction contact pad that is connected to the second side wall 254F.

With this design, the second encoder component 252B moves concurrently with the mover output 226 along the X axis and the second encoder component 252B is inhibited from rotating with the mover output 226 about the X axis.

Components for a suitable measurement system 16 can be obtained from Heidenhain, located in Germany, or from MicroE Systems, located in Natick, Mass. Alternatively, a suitable rotary encoder can be purchased from Dynamic Research Corporation, located in Andover, Mass.

The limit sensor assembly 232 detects when a portion of the mover assembly 16 is at a maximum proximal travel limit or at a maximum distal travel limit and sends a signal to the control system 18 so that the control system 18 knows when a portion of the mover assembly 16 is at the maximum proximal travel limit or at the maximum distal travel limit.

In FIGS. 2A and 2B, the limit sensor assembly 232 includes (i) an interrupter circuit board 256A, (ii) a first optical photointerrupter 256B that is secured to the interrupter circuit board 256A, (iii) a spaced apart second optical photointerrupter 256C that is secured to the interrupter circuit board 256A, (iv) a shutter plate 256D, and (v) an optical shutter 256E that is secured to the shutter plate 256D. In this embodiment, (i) the interrupter circuit board 256A and the optical interrupters 256B, 256C are fixedly secured to the mover bracket 222, and (ii) the shutter plate 256D and the shutter 256E are secured to the encoder head and move with the encoder head.

In one embodiment, each optical photointerrupter 256B, 256C includes a light source and a sensor that detects when the optical shutter 256E is positioned between the light source and the sensor. A suitable limit sensor assembly 232 can be made with components from Sharp, located in San Jose, Calif.

The wiper assembly 234 inhibits dust generated from the operation of the actuator 230 from traveling to the measurement system 20. In one embodiment, the wiper assembly 234 is positioned between the actuator 230 and the measurement system 20 and the wiper assembly 234 moves concurrently along the X axis with the mover output 226. However, in this embodiment, the wiper assembly 234 does not rotate with the mover output 226. In FIGS. 2A and 2B, the wiper assembly 234 includes a first plate 258A, a second plate 258B, and a third plate 258C that are secured together and move concurrently with the mover output 226 along the X axis. In this embodiment, each plate 258A, 258B, 258C includes an aperture for receiving the mover output 226. Further, the first plate 258A and the third plate 258C are made of a rigid material and the second plate 258B is made of a resilient material.

In one embodiment, the wiper assembly 234 is fixedly secured to and moves with the second encoder component 252B. For example, in FIGS. 2A and 2B, a shaft mounting ring 260 is used to clamp the wiper assembly 234 against the second encoder component 252B. More specifically, in this embodiment, the shaft mounting ring 260 cooperates with ring shaped housing 252C of the first encoder component 252A to clamp the wiper assembly 234 to the second encoder component 252B. A fastener 262 can be used to fixedly secure the shaft mounting ring 260 to the mover output 226. As an example, the fastener 262 can be a set screw or an adhesive.

Figure 4A:
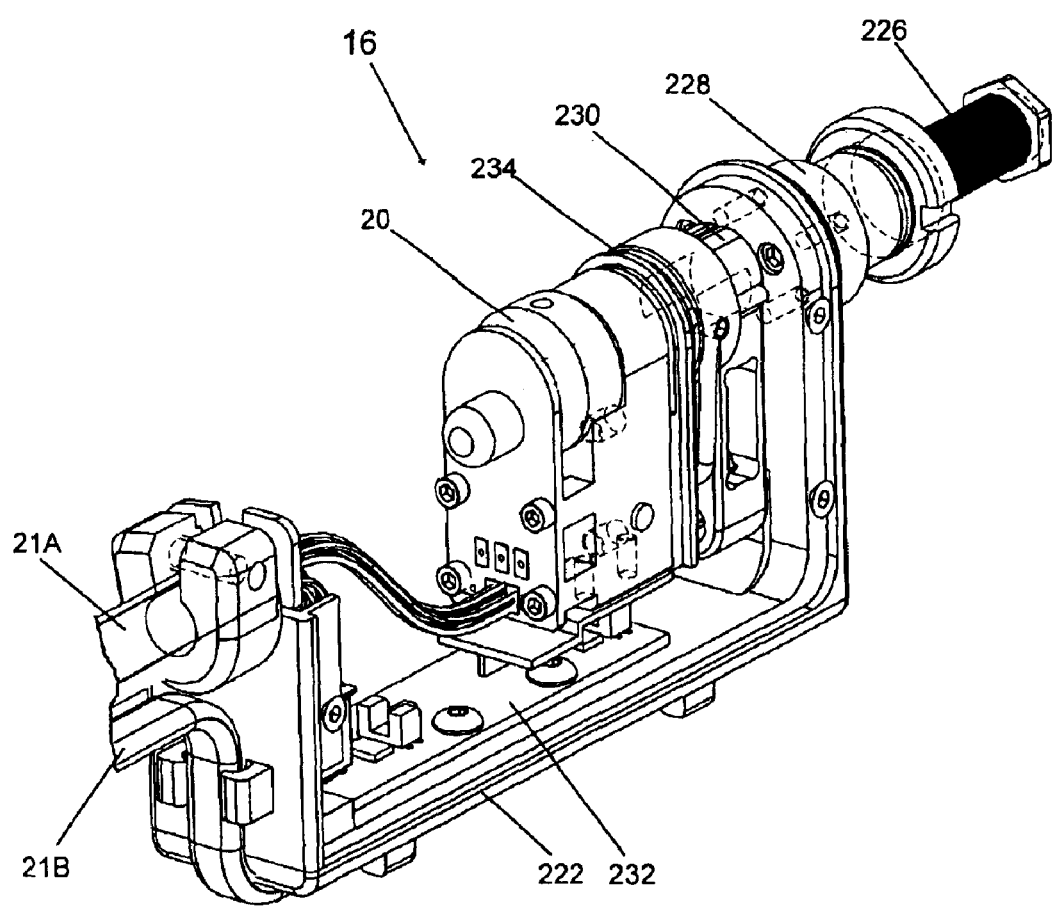
FIG. 4A is a perspective view of a portion of the mover assembly of FIG. 1A.
Figure 4B:
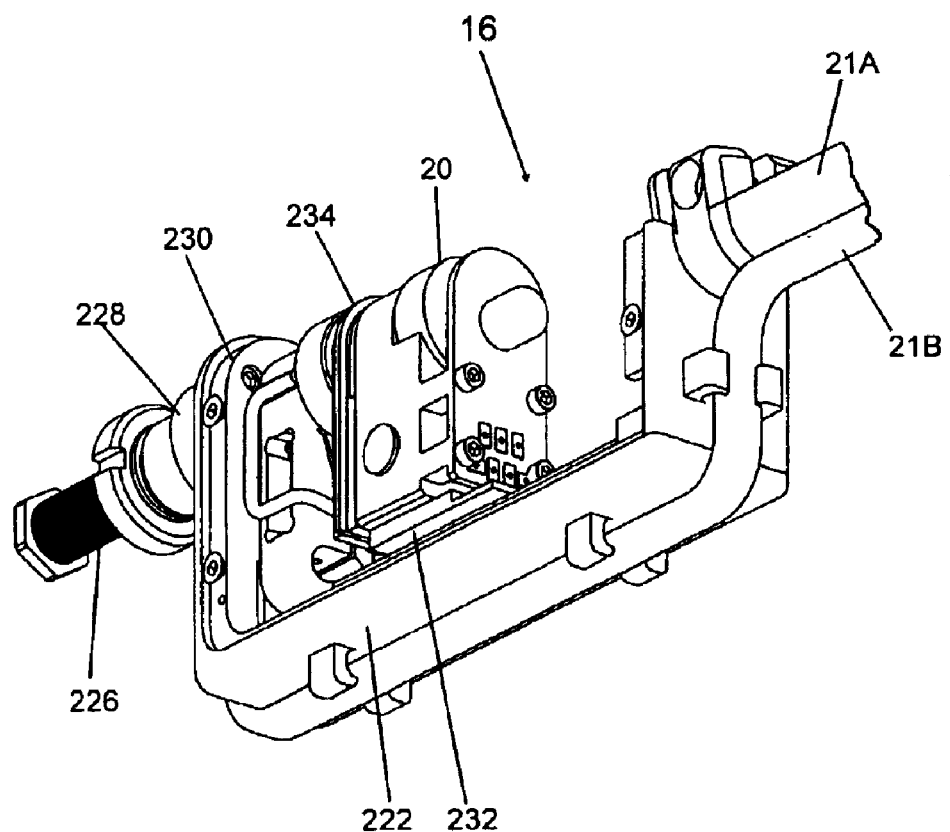
FIG. 4B is an alternative perspective view of a portion of the mover assembly of FIG. 1A.

FIG. 4A is a first perspective view and FIG. 4B is a second perspective view of a portion of the mover assembly 16 including the electrical lines 21A, 21B, the mover bracket 222, the mover output 226, the output guide 228, the actuator 230, the limit sensor assembly 232, the wiper assembly 234 and the measurement system 20 with the mover cover removed.

Figure 5A:
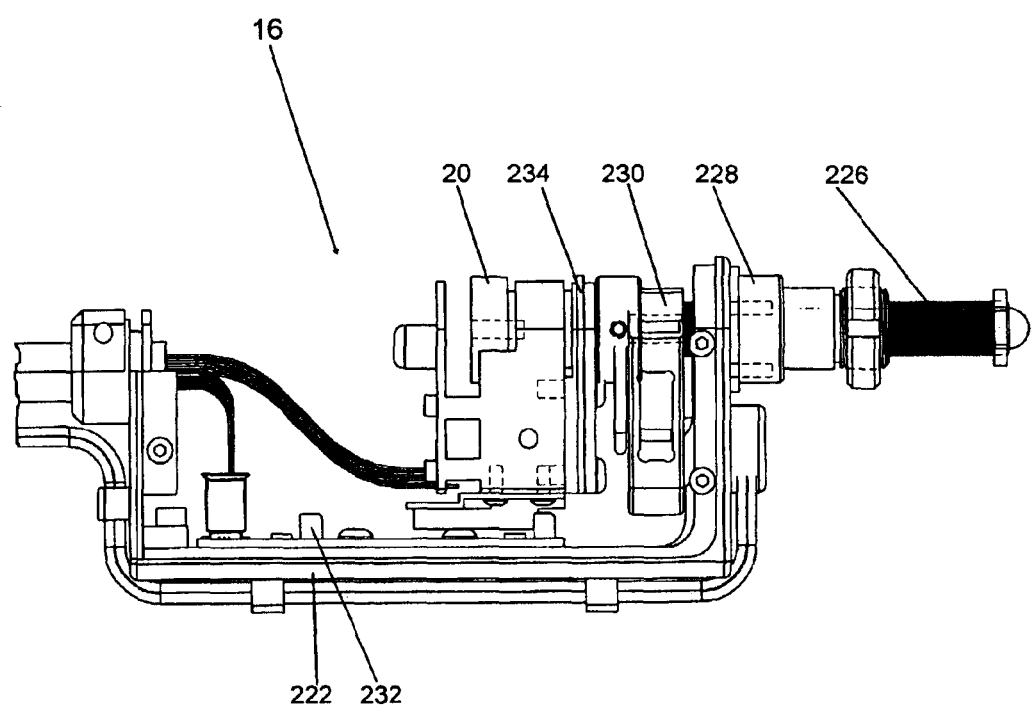
FIG. 5A is a side view of a portion of the mover assembly of FIG. 1A.
Figure 5B:
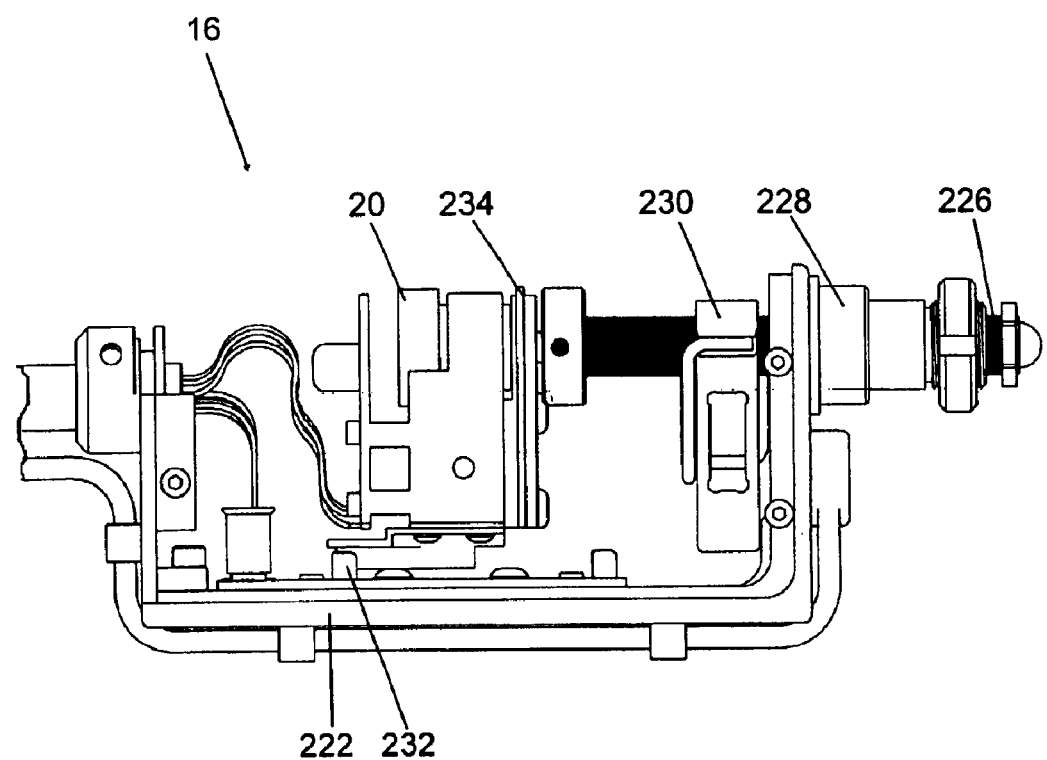
FIG. 5B is an alternative side view of the portion of the mover assembly of FIG. 1A.
Figure 5C:
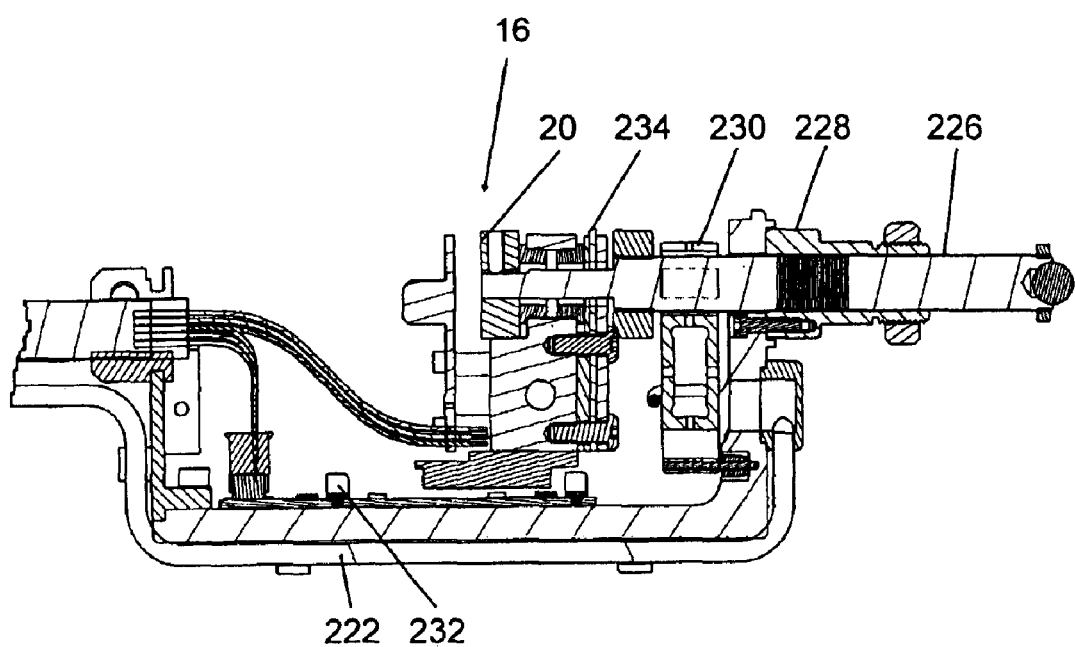
FIG. 5C is a cross-sectional view of the portion of the mover assembly of FIG. 5A.

FIGS. 5A and 5B are alternative side views of the mover assembly 16 and FIG. 5C is a cross-sectional view of the mover assembly 16 including the mover bracket 222, the mover output 226, the output guide 228, the actuator 230, the limit sensor assembly 232, the wiper assembly 234 and the measurement system 20 with the mover cover removed. FIGS. 5A–5C illustrate that the measurement system 20 moves with the mover output 226.

In one embodiment, as provided above, with the known thread pitch of the externally threaded surface 244C of the mover output 226, the control system 18 can convert the rotary encoder information to linear position information of the mover output 226. However, the thread pitch of the externally threaded surface 244C of the mover output 226 may not be exactly known and/or the thread pitch of the externally threaded surface 244C of the mover output 226 may vary along the mover output 226. As a result thereof, the control system 18 may need to provide correction to the positional information of the mover output 226 from the measurement system 20.

The type of positional correction on the measurement information from the measurement system 20 can vary. For example, in one embodiment, the mover output 226 can be mapped and calibrated. More specifically, the mover assembly 16 can be directly tested and the linear position of the mover output 226 can be directly measured with another measurement device (not shown) at one or more encoder counts measured by the second encoder component 252B. With this information, positional correction can be preformed by the control system 18.

Figure 6:
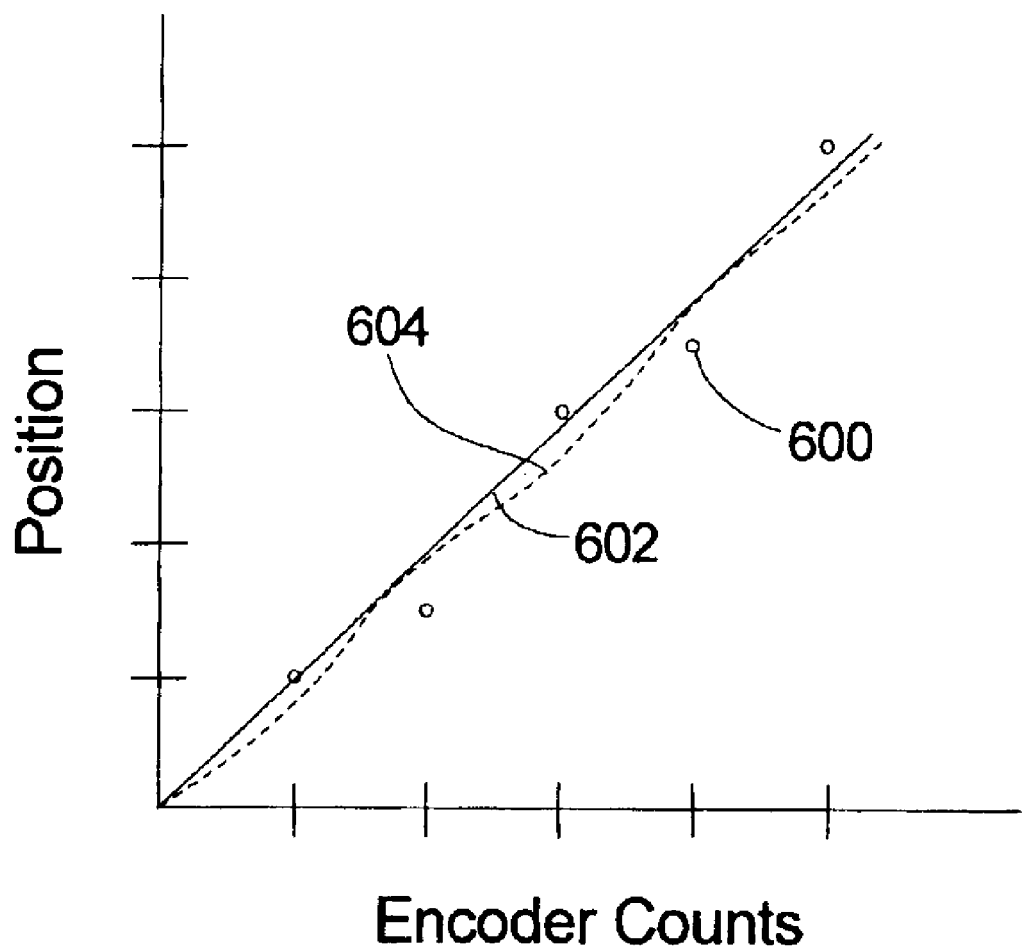
FIG. 6 is a graph that illustrates position versus encoder count.

As an example, referring to FIG. 6, at a plurality of spaced apart encoder counts, the actual linear position of the mover output 226 can be measured. In FIG. 6, data points 600 represent the actual measured linear position of the mover output 226. The number of measured data points 600 can vary. For example, the test can include any number of data points, including 5, 10, 100, or 1000, or more data points 600. FIG. 6 illustrates that five data points 600 were utilized. The data points 600 can be taken at spaced apart intervals of encoder counts. For example, data points 600 can be collected at intervals of 5, 10, 100, or 500 encoder counts.

In one embodiment, with the information regarding the data points 600, slope correction can be preformed. In FIG. 6, dashed line 602 illustrates a corrected slope that is derived using the data points 600. With this design, the control system 18 uses the measured encoder counts from the second encoder component 252B and the corrected slope to estimate the linear position of the mover output 226.

In another embodiment, with the information regarding the data points 600, curve fitting interpolation can be performed. In FIG. 6, line 604 represents a simplified curve fitted line that is derived using data points 600. With this design, the control system 18 uses the measured encoder counts from the second encoder component 252B and the curve fitted line to estimate the linear position of the mover output 226. As illustrated in FIG. 6, fit line 604 extends intermediate the data points 600 with approximately as many data points 600 on each side of the fit line 604. There are a number of alternative ways to generate the fit line 604. For example, the fit curve can be a parabola that best averages the data points 600. Alternatively, other types of generic curve functions (polynomials) can be used for the fit curve.

In yet another embodiment, the control system 18 can use a lookup table that is made during testing of the mover assembly 16. In this embodiment, for example, a data point 600 can be collected at each or some of the encoder counts to form the lookup table. With this information, for a measured encoder count, the control system 18 can find the corresponding measured linear position using the lookup table. In this embodiment, if a particular encoder count does not have a corresponding entry in the lookup table, the control system 18 can interpolate or compute the linear position from the other entries in the lookup table.

Figure 7A:
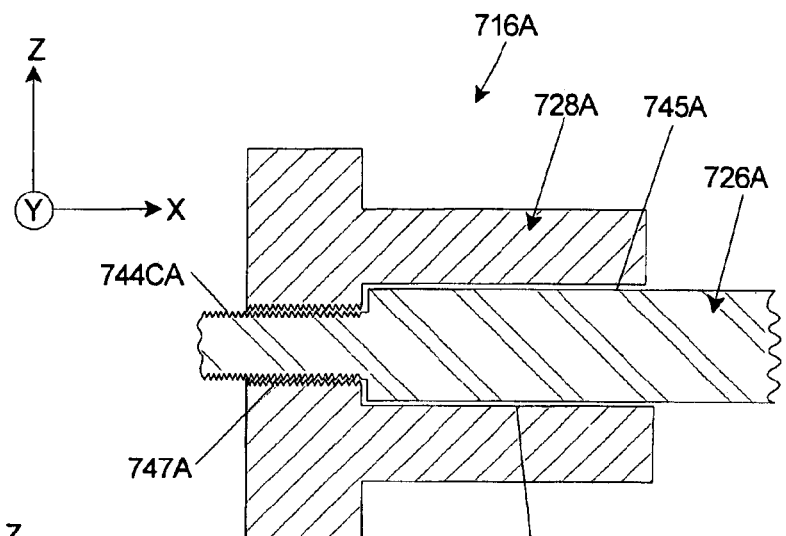
FIG. 7A is an illustration of an alternative embodiment of a portion of the mover assembly.

FIG. 7A is an illustration of an alternative embodiment of a portion of a mover assembly 716A. More specifically, FIG. 7A illustrates a portion of another embodiment of the mover output 726A and a portion of another embodiment of the output guide 728A. In this embodiment, the outer circumference of the mover output 726A includes an externally threaded surface 744CA and a smooth output guide surface 745A and the inner surface of the output guide 728A includes an internally threaded surface 747A and a smooth guide surface 749A. With this design, the threaded surfaces 744CA, 747A cooperate to provide constraint along the X axis and the guide surfaces 745A, 749A cooperate to guide the motion of the mover output 726A.

Figure 7B:
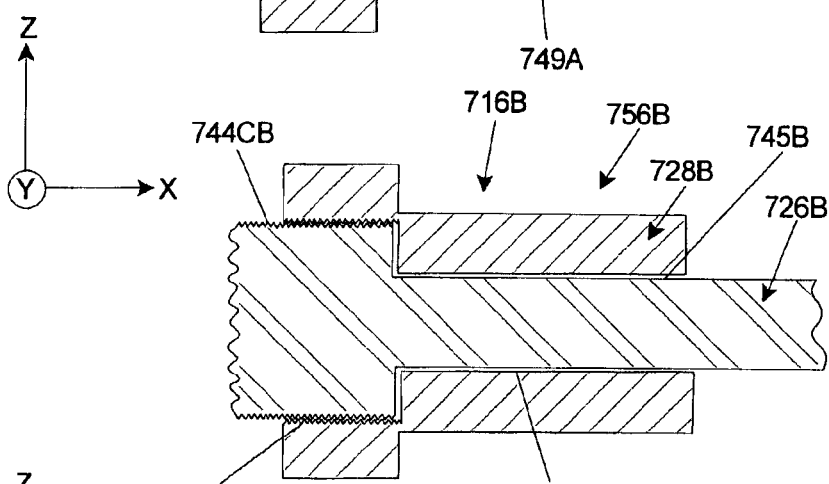
FIG. 7B is an illustration of yet another alternative embodiment of a portion of the mover assembly.

FIG. 7B is an illustration of yet another alternative embodiment of a portion of a mover assembly 716B. More specifically, FIG. 7B illustrates a portion of another embodiment of the mover output 726B and a portion of another embodiment of the output guide 728B. In this embodiment, the outer circumference of the mover output 726B includes an externally threaded surface 744CB and a smooth output guide surface 745B and the inner surface of the output guide 728B includes an internally threaded surface 747B and a smooth guide surface 749B. With this design, the threaded surfaces 744CB, 747B cooperate to provide constraint along the X axis and the guide surfaces 745B, 749B cooperate to guide the motion of the mover output 726B.

Figure 7C:
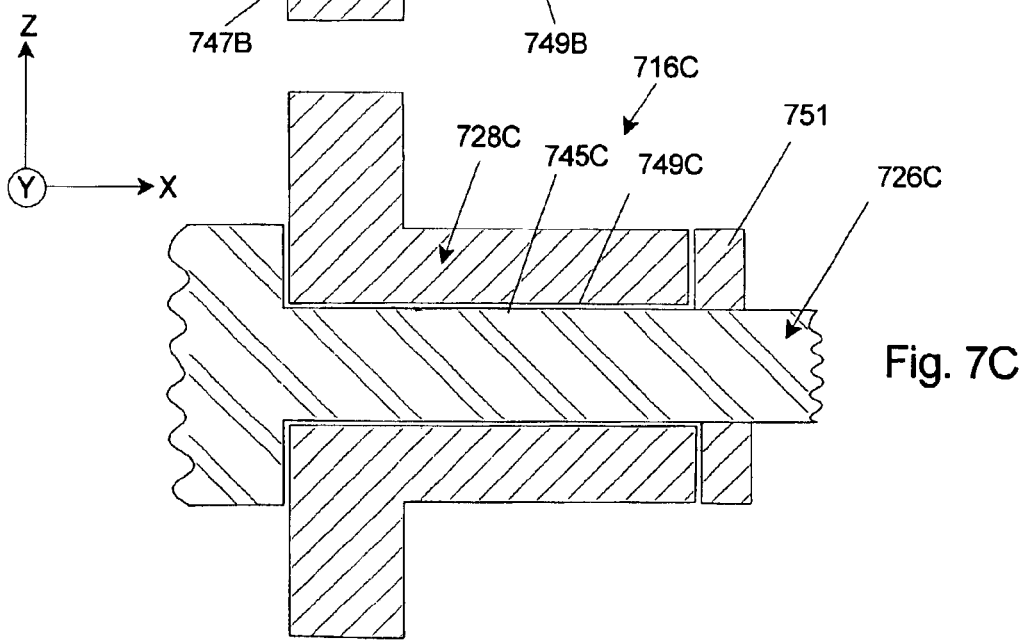
FIG. 7C is an illustration of still another alternative embodiment of a portion of the mover assembly.

FIG. 7C is an illustration of still another alternative embodiment of a portion of a mover assembly 716C. More specifically, FIG. 7C illustrates a portion of another embodiment of the mover output 726C and a portion of another embodiment of the output guide 728C. In this embodiment, the outer circumference of the mover output 726C includes a smooth output guide surface 745C and the inner surface of the output guide 728C includes a smooth guide surface 749C. Further, a lock ring or thrust bearing 751 cooperates with the mover output 726C to inhibit motion of the mover output 726C relative to the output guide 726C along the X axis. With this design, rotation of the mover output 726C by the actuator 230 (illustrated in FIG. 3) results in rotation of the mover output 726C without linear movement of the mover output 726C along the X aixs.

While the particular mover assembly 16 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A mover assembly that moves or positions an object, the mover assembly comprising:
   a mover output that is coupled to the object;
   an actuator that causes the mover output to rotate about a first axis and move along the first axis; and
   a measurement system that directly measures the movement of the mover output, the measurement system including a first encoder component that is secured to the mover output and a second encoder component positioned adjacent to the first encoder component, wherein the first encoder component rotates concurrently with the mover output about the first axis and moves concurrently with the mover output along the first axis, and wherein the second encoder component moves concurrently with the mover output along the first axis.

2. The mover assembly of claim 1 wherein the first encoder component includes a plurality of lines and the second encoder component includes an encoder head.

3. The mover assembly of claim 1 wherein the measurement system measures the movement of the mover output about the first axis.

4. The mover assembly of claim 3 wherein the movement of the mover output along the first axis is calculated using information about the movement of the mover output about the first axis.

5. The mover assembly of claim 1 wherein the actuator includes a piezoelectric element that causes rotation of the mover output.

6. The mover assembly of claim 5 wherein the actuator includes a pair of opposed jaw elements that engage the mover output and the piezoelectric element moves the jaw elements relative to each other.

7. The mover assembly of claim 1 further comprising a control system that receives measurement information from the measurement system and performs positional correction on the measurement information.

8. The mover assembly of claim 1 wherein the mover output includes a threaded surface having a thread pitch and movement of the mover output along the first axis is calculated utilizing the thread pitch.

9. A precision apparatus including an object and the mover assembly of claim 1.

10. A method for moving or positioning an object, the method comprising the steps of:
   connecting a mover output to the object;
   moving the mover output with an actuator along a first axis and about the first axis; and
   directly measuring the movement of the mover output by securing a first encoder component to the mover output and positioning a second encoder component adjacent to the first encoder component, wherein the first encoder component rotates concurrently with the mover output about the first axis and moves concurrently with the mover output along the first axis, and wherein the second encoder component moves concurrently with the mover output along the first axis.

11. The method of claim 10 wherein the first encoder component includes a plurality of lines and the second encoder component includes an encoder head.

12. The method of claim 10 wherein the step of directly measuring includes measuring the movement of the mover output about the first axis.

13. The method of claim 10 wherein the actuator includes a piezoelectric element that causes rotation of the mover output.

14. The method of claim 13 wherein the actuator includes a pair of opposed jaw elements that engage the mover output and the piezoelectric element moves the jaw elements relative to each other.

15. The method of claim 10 further comprising the step of performing positional correction on the measured movement of the mover output.

* * * * *